(12) United States Patent
Nesveda

(10) Patent No.: US 11,814,332 B2
(45) Date of Patent: Nov. 14, 2023

(54) BISMUTH-BASED ENERGETIC MATERIALS

(71) Applicant: SELLIER & BELLOT A.S., Vlasim (CZ)

(72) Inventor: Jiri Nesveda, Vlasim (CZ)

(73) Assignee: SELLIER & BELLOT A.S., Vlasim (CZ)

( * ) Notice: Subject to any disclaimer, the term of this patent is extended or adjusted under 35 U.S.C. 154(b) by 1117 days.

(21) Appl. No.: 16/260,157

(22) Filed: Jan. 29, 2019

(65) Prior Publication Data

US 2019/0152873 A1 May 23, 2019

Related U.S. Application Data

(62) Division of application No. 15/034,552, filed as application No. PCT/CZ2014/000129 on Nov. 6, 2014.

(51) Int. Cl.
| | |
|---|---|
| *C06B 35/00* | (2006.01) |
| *C01G 29/00* | (2006.01) |
| *C06C 7/00* | (2006.01) |
| *C07F 9/94* | (2006.01) |
| *C06B 41/00* | (2006.01) |
| *C06B 43/00* | (2006.01) |
| *B60R 21/26* | (2011.01) |
| *C06C 9/00* | (2006.01) |

(52) U.S. Cl.
CPC .............. *C06B 35/00* (2013.01); *C01G 29/00* (2013.01); *C06B 41/00* (2013.01); *C06B 43/00* (2013.01); *C06C 7/00* (2013.01); *C07F 9/94* (2013.01); *B60R 2021/26029* (2013.01); *C06C 9/00* (2013.01)

(58) Field of Classification Search
None
See application file for complete search history.

(56) References Cited

U.S. PATENT DOCUMENTS

| | | | | |
|---|---|---|---|---|
| 3,338,915 A | * | 8/1967 | Brown | .................... C06B 43/00 548/254 |
| 4,566,921 A | * | 1/1986 | Duguet | .................... C06B 25/34 149/78 |
| 5,639,987 A | | 6/1997 | Berteleau et al. | |
| 5,652,409 A | | 7/1997 | Thompson et al. | |
| 5,939,045 A | | 8/1999 | Suzuki et al. | |
| 6,168,677 B1 | | 1/2001 | Warren et al. | |
| 6,878,221 B1 | * | 4/2005 | Mei | ........................... C06C 7/00 149/41 |
| 8,206,522 B2 | | 6/2012 | Sandstrom et al. | |
| 2007/0011751 A1 | | 1/2007 | Hasu et al. | |
| 2008/0308201 A1 | | 12/2008 | Bley et al. | |

FOREIGN PATENT DOCUMENTS

| | | |
|---|---|---|
| CN | 102161628 B | 8/2011 |
| DE | 102010036950 A1 | 2/2012 |
| EP | 2338863 | 6/2011 |
| WO | WO 2007/071650 | 6/2007 |

OTHER PUBLICATIONS

International Preliminary Report on Patentability for PCT Application No. PCT/CZ2014/000129 dated Feb. 11, 2016.
International Search Report and Written Opinion for PCT Application No. PCT/CZ2014/000129 dated Mar. 6, 2015.
Ren, Ying-Hui, et al., "Synthesis, Decomposition Reaction Kinetics and Thermal Safety of Bismuth Complex of Picric Acid," Chinese Journal of Explosives & Propellants, vol. 33, No. 5 (2010): pp. 19-24.
Villinger, Alexander and Axel Schulz, "Binary Bismuth (III) Azides: $Bi(N_3)_3, [Bi(N_3)_4]^-$, and $[Bi(N_3)_6]_3^-$," Angewandte Chemie International Edition, vol. 49, No. 43 (2010): pp. 8017-8020.
Database CA [online] Chemical Abstracts Service, Columbus, Ohio, US; Gusev, S. I. et al: "Reactions of thiourea and selenourea complexes of bis-muth with picrolonic and picric acids", XP002735334, retrieved from STN Database accession No. 1962:18312; & Gusev, S. I. et al: "Reactions of thiourea and selenourea complexes of bis-muth with picrolonic and picric acids", Zhurnal Neorganicheskoi Khimii, 6, 1881-4 Coden: ZNOKAQ; ISSN: 0044-457X, 1961, pp. 1881-1884, XP009182290.
M.B. Talawar et al. Environmentally compatible next generation green energetic materials (GEMs) Journal of Hazardous Materials 161, 2009 pp. 589-607.
Search Report for Application No. PV 2013-858 dated Aug. 15, 2014.

* cited by examiner

*Primary Examiner* — Aileen B Felton
(74) *Attorney, Agent, or Firm* — Mark S. Cohen; PEARL COHEN ZEDEK LATZER BARATZ LLP

(57) ABSTRACT

Energetic compounds based on bismuth salts with reduced toxicity that are obtained through the reaction of soluble bismuth salts with soluble salts of organic or inorganic energetic compounds based on azides, derivatives aromatic nitro compounds or nitrogenous heterocyclic compounds, together with the methods for their preparation and application.

9 Claims, No Drawings

BISMUTH-BASED ENERGETIC MATERIALS

RELATED APPLICATIONS

This application is a divisional application of U.S. Ser. No. 15/034,552, filed May 5, 2016, which is a National Phase Application of PCT International Application No. PCT/CZ2014/000129, International Filing Date Nov. 6, 2014, published as WO 2015/067228 on May 14, 2015, claiming priority of Czech Republic Patent Application No. PV 2013-858, filed Nov. 7, 2013, all of which are hereby incorporated by reference.

FIELD OF THE INVENTION

This invention relates to bismuth-based energetic compounds and the method of their preparation and usage.

BACKGROUND ART

Recent years have seen a growing pressure on manufacturers dealing with the production and processing of the materials referred to as "energetic", i.e. explosives and pyrotechnical compounds, including the producers of ammunition, with the aim of achieving the total elimination of the utilisation of toxic materials—primarily compounds based on toxic metals—as disclosed further. These are actually cations of mostly precious metals bonded within organic and inorganic molecules that are virtually irreplaceable, because they form compounds that have served as excellent primary explosives for more than 100 years now, i.e. primary explosives constituting the principal components of ignition systems in primers for ammunition of all calibres, electric matches and detonators of various types.

Ammunition manufacturers have been particularly focussing their attention on replacement of lead salts of polynitrophenols, such as lead trinitroresorcinate, which is the basic primary explosive, together with other compounds such as lead (II) 4,6-dinitro-o-cresolate used in electric matches. Some of the previous applications used picrate and lead dinitroresorcinate as auxiliary explosives but those are history now. These compounds had stood-in as successful replacements for the still legendary mercury(II) fulminate since the beginning of the previous century; it is actually extremely toxic but is nevertheless an irreplaceable compound that is characterised by its extremely high flame temperature (T) influencing its extraordinarily high ignition ability.

Irreplaceability of salts of heavy, precious metals, just like lead with aromatic polynitro or other energetic compounds with acidic characteristics, e.g. nitrogenous heterocyclic compounds—tetrazoles etc.—lies in the release of the vast amount of heat that is generated during the condensation of the vapours of these relatively low-boiling metals. This heat is then transferred in steps into a propellant charge in order, for example, to achieve the maximum efficiency of the heat transfer and the ignition temperature (T) required. When combined with other components creating a suitable pyrotechnical system, these explosives benefit from an extended ignition impulse and the generation of a sufficient quantity of condensed product with the highest heat capacity possible and in this manner the heat transfer efficiency is improved even more. However, the primary explosives identified above are not able alone to full fill all requirements for reliable function of primer—they lack sufficient sensitivity to stab ignition, which is created by combining friction and impact, with the friction strongly prevailing, while some of them show too great brisance. That is the reason for the utilisation of additional auxiliary components—i.e. sensitising or friction agents that can be selected from 2 types of materials, either active or inert. The active sensitising agents used may comprise other explosives with a substantially lower ignition temperature as compared to the default explosive. The friction between the crystals inside the default explosive during its puncturing by the anvil or by the stab releases a certain amount of heat and causing a local increase of the temperature (T), depending on the intensity of the heat outlet. This will not be initiated if that value is lower than the explosion temperature of the default explosive. If several percent of the application also comprises an active sensitising agent with a lower ignition temperature, the latter will be initiated first and the heat released by the reaction will then ignite the main explosive. This is the operating principle of TNRO—tetrazene—proven during the 100 years of its practical application. Since tetrazene, similarly to various other metal-free explosives, is soft, its quantity may not exceed the defined limit—actually just several percent—to ensure that the friction does generate a sufficient amount of heat. If the primary explosive used is similar to tetrazene, the second of the above-mentioned principles comes to mind—the utilisation of an inert material with its grains dispersed evenly in the explosive and functioning as accumulators of the heat energy concentrated on their surface to once again induce a local increase of temperature (T). This is based on the principle that these must be high-melting compounds with a melting point greatly exceeding the ignition temperatures of the generally known explosives—i.e. at least 550° C., and therefore the compounds utilised must definitely be heat and thermally non-conductive. These characteristics are extremely important, as the events occurring are thermally transient processes that need to be compensated by the ambient removal of heat. The important factors here are not only the quantity but also the size of particles—these are essential factors as to whether the material will function as a real sensitising agent or just as waste ballast cooling the compound in an undesired manner. Long-term experience and the research carried out for finding the optimal friction agent have provided evidence of the suitability of ground glass as an optimal material—generally by using materials in their "glass" state together with certain high-melting sulphides, e.g. antimony sulphide, that has been in use for almost 200 years, both in compounds that contain mercury (II) fulminate and in compounds based on TNRO, in which it also functions as a fuel in addition to acting as a friction agent. However, this does not conform in regard to the relevant environmental issues. The use of ground glass is also problematical—there is a difference between the material obtained by the fragmentation of glass waste from glass plants—a method utilised by numerous ammunition factories—and a different material produced by grinding, using ball mills, which has a significantly more even structure together with a lower sensitising ability—resulting from its rounded corners and edges where energy concentrates. There is also a technological issue involved with the utilisation of "crushed" waste—i.e. obtaining a sufficient amount of the material fraction required from the total amount of the waste. This type of glass may additionally induce undesired activations, e.g. during drop tests of primers from lower fall heights.

The above reasons help to define the optimal characteristics of the main primary explosive that can be used in ammunition primers with respect to their optimal functioning: its maximum sensitivity to stab, preferably without using any or very small amount of frictional agents, its minimal brisance, the high content of condensed products in its combustion products and the high degree of efficiency of the mechanism for transferring the heat from products to the propellant. Nowadays, however, there are also additional aspects to be considered, e.g.: Firstly, stability—the requirement for a high degree of thermal stability determined in accordance with the thermal decomposition temperature and with chemical stability—the material must not react to atmospheric moisture, atmospheric gases nor any other materials used in ammunition production and it must not be sensitive to daylight s—i.e. it may not contain any compounds of Ag. Secondly, environmental—nor may the material contain any toxic metals such as Pb, Hg, Sb, Ba and they must be also free of any perchlorates that have also been identified as being toxic.

The base material must comprise either an organic or an inorganic compound comprising molecules that include certain functional groups defined as "explophors"—i.e. explosibility carriers in the descriptions provided of contemporary explosives. It mainly comprises a combination of two or more electronegative elements with relatively wake bonds, i.e. their bonding energy is low; and these bring the whole molecule to a certain degree of instability that is called explosibility. Such compounds then offer the possibility for exothermal decomposition releasing Gibbs free energy and of forming more stable products with stronger bonds. This essential principle, derived from the principles of thermodynamics and of reaction kinetics, is applicable both to compounds and to explosive mixtures.

The functional groups mentioned above, e.g. the nitro group—$NO_2$, the nitroso group—NO, the hydrazino group—$NHNH_2$, the hydroxyl amino group—NHOH, the nitramino group—$NHNO_2$, the hydrazo group—HN—NH—, the azo group —N=N—, the azido group—$N_3$, the diazo group—$N_2+$, the furoxane group, etc., are common known and when combined with aliphatic as well as cyclic—aromatic or heterocyclic compounds, together they constitute hundreds of explosive compounds, then jointly referred to as "energetic materials". Most of these compounds were first discovered and described approximately 100 years ago but their widest application is restricted to those with acidic characteristics that enable the formation of salts with both organic and inorganic alkalis and also, especially with some precious but mostly toxic metals. The historical discovery of mercury(II) fulminate and especially the salts of polyaromatic nitrophenols, together with azides, at the beginning of the 1920's led to the production of the most effective explosives ever used.

The beginning of the last century obviously saw certain efforts being initiated towards replacing these toxic compounds with less toxic ones—i.e. compounds free of any toxic metals, especially mercury and lead and even barium. For example tetrazene, discovered in the year 1910, is a purely organic compound yet its characteristics predestine this compound to act only as an active sensitising agent for other explosives—e.g. lead trinitroresorcinate. It has a very complex molecule itself and therefore its explosive decomposition is relatively complex, while, similarly to other explosives with a content of guanyl in molecules the explosion temperature (T) is very low. Also taking into account its thermal instability and extreme inclination towards dead pression, this explosive can never become an adequate replacement for TNRO nor can it ever comply with the requirements defined above. That is similar to dinitrodiazophenol—Dinol, DNDP—discovered as early as 1858 and used exclusively in paint industry, while its explosive characteristics were discovered only about 100 years later and it became a component of blasting caps manufactured in the USA, becoming the main "environmentaly friendly" primary explosive in the famous German primer composition Sintox at the beginning of the 1980's. With respect to its functioning in primers its main drawbacks are its brisance and the low content of condensed products in its combustion products. As far as its environmental compatibility is concerned, it has many unpleasant physiological side-effects that occur during its handling—e.g. it is irritant to the skin and to the mucous membranes. The negative oxygen balance prevents complete thermal its perfect decomposition during explosion in primers and it releases toxic fragments of an aromatic polynitro system. As far as stability is concerned, dinol is also regarded as unstable, which is demonstrated by intense colour changes caused by daylight. This is typical of all diazo compounds. There are no problems with the chemical or the thermal stability of dinitro benzofuroxane, another explosive that was also discovered at the beginning of the last Century. Its production is very complicated, however, and it actually uses such highly toxic compounds with strong environmental impacts as trinitrochlorobenzene, without don't speaking about its extreme sensitivity to electrostatic charge.

The end of the $19^{th}$ Century also brought the discovery of heterocyclic nitrogenous rich compounds, the most famous one being five membered heterocycles having a single carbon and two substitutable hydrogens—tetrazoles. Their chemical, physical and explosive characteristics vary across a broad range depending on the functional group (see above) that substitutes hydrogen bonded with carbon—i.e. in position 5. That results in the formation of a tremendously diverse group of compounds, from non-explosive ones with a broad area of applicability in the chemical and the pharmaceutical industries (alkyl and arly, thio- and cyano-derivates) to energetic compounds (amino, hydrazino derivatives or bistetrazole formed by two tetrazole cycles linked together), to typical primary explosives (halogen, nitro derivatives, nitramino derivatives, diazo aminotetrazole and azotetrazole formed by two tetrazole cycles linked with an azo group) and to the extremely explosive azidotetrazole and diatetrazole considered as amongst the most unstable and hazardous compounds known because of their capability of spontaneous explosion even in strongly diluted aqueous solutions! These were actually only the few compounds that caused the erroneous designation of this entire large group of substances as hazardous explosives, whereas 90% of them actually found their use in many other applications. Since tetrazoles are acidic and form weaker or stronger acids, depending on the substituent utilised, in addition to metal salts they are also able to form salts of organic and inorganic alkalis. These salts, primarily those of the precious and heavier metals, have been sparking the interest of explosive manufacturers for about 100 years. Salts of lead, barium, silver, mercury and copper have been included in dozens of patents, especially during the period between the 1920's and the 1950's. Despite the extraordinary interest in them, there have been only a few cases, however, in which these salts were practically utilised. Germany launched the production of the alkaline lead salt of 5,5'-azotetrazole—and the 1980's saw the introduction of the mercuric salt of 5-nitro-tetrazole in the US NAVY (exclusively for use in blasting caps) as a chemically more stable but not environment friendly replacement for lead azide.

The applicability of salts of inorganic or organic alkalis depends on their stability, which is directly proportional to the stability of the alkali. Salts of weak alkalis, such as ammonia, hydrazine or hydroxylamine, are less stable, whereas salts containing guanidine or its derivatives (amino, diamino and triamino guanidines) are highly stable and nowadays are at the height of their popularity. Tens of patents have been filed during the past 20 years referring to the applicability of these compounds for use in propulsion systems—rockets, gas generators and modern azide-free airbag inflators. These compounds lack any characteristic of intial explosives however.

There are also condensation products of some tetrazoles with aromatic polynitro compounds that were first patented in Germany in the year 1957. These are produced by the reaction of the alkaline salts of tetrazoles either with the chlorderivatives of organic polynitro compounds or with tetranitro-aniline Examples include the sodium salt of 5-nitro-tetrazole or the disodium salt of 5,5'-bistetrazole reacting with either picryl chloride or styphnyl dichloride to produce 2-picryl-5-nitrotetrazole or styphnyl bistetrazole or dipicryl bistetrazole. Similar compounds are currently manufactured by the German company Dynitec. Their characteristics resemble those of explosives but they are used only for special applications.

Another group comprises compounds, in which tetrazoles play the role of a weaker or a stronger alkali and therefore these compounds are able to form salts with other explosive compounds with acidic characteristics—e.g. polynitrophenols, hydrazoic acid, perchloric acid and dinitramide. These compounds are subjects of research by German scientists. One starting point may be 5-amino tetrazole, for example; its acidity reduced by methylation to produce a 2-methyl or even a 2,4-dimethyl derivative. The first of these is a weak alkali, only capable of forming salts with strong acids; the second is a strong alkali, able to form salts, even using weaker acids, to produce the relevant azides and dinitramides. As one could expect, characteristics of primary explosives can be found in perchlorates only, yet those are considered toxic now, not to mention corrosive products of thermal decomposition and dinitramide salts discovered in Russia in the 1970's but its cost-efficient industrial production still needs to be finalised. Various discoveries involved other derivatives of tetrazole as well—e.g. bistetrazole amine—BTA, which, although not a primary explosive, is an energetic compound.

There is also another group of complex and binary explosive salts. Such compounds, now regarded as historical milestones, were discovered by the Swedish chemist E. Stabba in the 1960's and are called "stabanates" and these combine binary metal salts of 5-nitraminotetrazole and 5,5'-diazoaminotetrazole with styphnic acid. Unfortunately those are exclusively lead salts only. Other compounds, in which tetrazoles form complex salts with certain anions of inorganic acids (perchloric acid, nitric acid, hydroazoic acid) as well as some metal cations, are also compounds historically labelled as CP, i.e. pentaamine(5-cyano-2H-tetrazolato-N2)cobalt(III) perchlorate, or the similar BNCP, i.e. tetraamine-cis-bis(5-nitro-2H-tetrazolato-N2)cobalt(III) perchlorate.

Patents and patent applications from recent years, e.g. DE 102010036950 A1, include similar complex compounds but these are free of any undesired perchlorates with their central atom formed from one of the transition elements an making advantage of Co that forms such complex cations as the diatomic pentaamino cobalt azide or the positively monovalent pentaamino cobalt diazide or similar ions of pentaamino cobalt nitrate or of tetraamino cobalt dinitrate, forming salts with anions contained in such explosive tetrazole derivatives as 5-nitrotetrazole, 5-nitraminotetrazole, 5,5'-azotetrazole and even 5,5'-diazoaminotetrazole. Examples of the resultant products may include any the following—pentaamine (azido) cobalt (III) azotetrazolate, pentaamine (azido) cobalt (III) nitrotetrazolate and pentaamine (azido) cobalt (III) nitraminotetrazolate. These compounds contain cobalt, however, now, like nickel, they are ranked amongst the toxic elements. The sensitivity to friction manifested by these compounds is very low and thereby, in this respect, they are predestined rather for detonators and their application in primers could bring about serious problems—the need for extreme sensitisation. The authors of the patent also refer to the simple metal salts of basic explosive tetrazoles (5-nitrotetrazole, 5-nitraminotetrazole, 5,5'-diazoaminotetrazole and 5,5'-azotetrazole) and those are the salts of Fe, Cu and Na. The salts of Fe and Na are characterised by their very low sensitivity to friction once again, not to mention their variable content of crystal water (especially in Na salt), whereas the salts of Ca (primarily 5-nitrotetrazole and 5,5'-azotetrazole) are brisant primary explosives that pose a serious handling hazard. These compounds neither could be recommended for primer production. The authors also refer to compounds based on copper styphnate, for example, as this is a tetrahydrate becoming explosive upon dehydration only and even a mixture based on the free styphnic acid, which is obviously not a primary explosive. According to the authors, any compositions based on these compounds must contain an extremely high amount of a sensitising agent—i.e. up to 47% of grown glass!

Similarly, there is another published patent application—WO 2007/071650—that introduces the binary potassium-calcium salt of styphnic acid as "a new" primary explosive. There are similar compounds that are known about and are described in the monograph Bubnov, Suchov-Iniciruj ščeje vzryvčatyje věščestva. This "new" salt is defined as having an extraordinarily high ignition temperature of 350-400° C. and the authors recommend this compound primarily for azide-free and thermally stable compositions utilised for automotive airbag applications. The extremely high ignition temperature and the low sensitivity to friction referred to above would make its utilisation in primers problematical at most.

The future can be seen so far in complex compounds, where the central atom is an atom of bivalent iron or copper and the function of ligand is dedicated to 5-nitrotetrazolate anion containing between 3 and 6 ions. In case that the central anion is bonded with less than 6 nitrotetrazolate anions, the ones that are missing are replaced by molecules of water. These complex compounds, having very large molecule, form salts of inorganic ($Na^+$, $Ca^{2+}$, $Mg^{2+}$ and $NH^{4+}$) or of organic cations (hydrazonium, nitroso cyanaminide, 3,3-dinitroazetidine, 5-amino-1-nitroso-1,2,3,4-tetrazolium, 1,5-diamino-4-nitroso-1,2,3,4-tetrazolium, 1,2,5-triamino-1,2,3-triazolium, 3,6-bis-guanidinium-1,2,4,5-tetrazine, 3,6-bis-nitroguanidinium-tetrazine and 3,6-bis-hydrazinium-tetrazine and others). One example could be diammonium diaquatetrakis(5-nitro-1H-tetrazolato-N2) cuprate or ferrate. Similarly to other complex compounds, having a complex and very large molecula with a high content of organically bonded nitrogen acting in association with a balanced oxygen content to ensure high performance even with respect to large amounts of gaseous products. As far as the reaction kinetics of such voluminous and complex molecules is concerned, it should be assumed that these undergo a very complicated thermal decomposition, which is usually manifested by a reduced flame temperature. In addition to that, these compounds do not have the heat transfer mechanisms mentioned above that are utilised during phase changes (condensation) of the fumes of low-boiling metals. They are not recognised for utilisation in any commercial application related to ammunition primers and the authors recommend these compounds solely for detonators. The Los Alamos National Laboratory (LANL) patented these specific compounds in the year 2006 in US patent application No.—US2007/011751.

The above analysis implies that there have been no major recent discoveries in the area of primary explosives for ammunition primer caps during the period of approximately the last 50 years. This has resulted in the lack of availability of suitable compounds that would be able to fulfil the role of "green explosives" in order to comply with the demanding requirements imposed in regard to environmental protection.

DISCLOSURE OF THE INVENTION

The invention is concerned to the production and the application of new energetic compounds based on bismuth salts that, with their lower level of toxicity, will be the best replacements for such primary explosives as lead tricinate, the characteristics of which are optimal for its particular purpose and that is basically viewed by experts as being an irreplaceable primary explosive. As already stated above, this "irreplaceability" is mainly based on the presence of a heavy, more precious metal, which is bonded by a weak and easily cleavable bond to ensure a very efficient heat transfer mechanism.

Unfortunately, the periodic system offers only a very limited selection, however there is still a metal that is ranked amongst the heaviest elements known and, in accordance with the modern criteria and compared to various other metals used in ammunition production, its toxicity is considered as being amongst the lowest values measured. That is bismuth (Bi), included in group 5.A of the periodic table, located in the same sub-group as the incomparably more toxic arsenic and antimony. As far as certain physical properties are concerned—i.e. its melting point and its boiling point and its specific gravity—this element is similar to lead, its behaviour in its melted state when its specific gravity exceeding the value of its solid state level resembles rather arsenic, antimony or water in its solid state (ice), predestining this element for its application in special alloys that fill the mould perfectly, i.e. type metal, and in addition for the special low-melting eutectic alloys used in thermal fuses and for special solders. Bi has found its way into ammunition production during the last few decades and has been used in special alloys for replacing lead shots and for bullet cores. Based on their varied composition its oxides and oxynitrates, are often utilised as oxidising agents in modern, non-toxic pyrotechnical compounds and some non-explosive Bi salts are utilised in modern propellants as ballistic modifiers. Other options for its utilisation include the following—as a material for fuel cells, for carriers of U-235 and 233 in nuclear reactors, for semiconductors based on Bi-tellurides, as a super conductive material for mixed oxides of BiSrCaCu. The intensity of research especially increased during the 1990's with the specific purpose of implementing the maximum utilisation of Bi as a non-toxic replacement for lead. Bi in the form of vanadate has been utilised in non-toxic pigments, lubricants and even as a catalyst for the production of acrylic fibres, etc. It has also found extensive use in medicine, as a component of both historical and modern pharmaceutical and cosmetic products. So called the oxide salts (alkaline salts or sub-salts) of Bi, are uses for this purposes. They are compounds like (subnitrate, subcarbonate, subcitrate, subgalate and sub-salycitate) are insoluble in water, for internal and external use as anti-diarrheal medication, for treating gastrointestinal illnesses, for internal or external infections, for peptic ulcers and for skin diseases.

What makes Bi different from other heavy metals is its extreme tendency towards hydrolysis during solution in water or certain polar solvents. Hydrolysis is performed on a quantitative basis with the forming of alkaline products defined as oxide salts (or sub-salts or even alkaline salts). The solubility of these salts is so low that many of them are used for the gravimetric determination of Bi. Bi forms some of the most insoluble compounds ever, e.g. $Bi_2S_3$-pS (the negative logarithm of solubility product)=97!

Hydrolysis in aqueous solutions proceeds as indicated in the following equation:

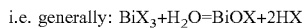

i.e. generally: $BiX_3+H_2O=BiOX+2HX$ where —X=an anion of an inorganic acid (e.g. $NO_3$—, Cl—, ClO4- or a remainder of an organic acid).

1 mole of "a normal" bismuth salt creates 1 mole of an oxide (alkaline) salt and 2 moles of the corresponding acid. In most cases the released acid cannot to acidify the solution to a sufficient level to maintain the Bi ions in a dissolved state and the Bi will therefore be precipitated, forming an alkaline (oxide) salt, which obviously makes it unusable for any further precipitation (e.g. certain explosive salts). Any solution of a sufficient concentration suitable for practical application would require strong acidification but such an acidic solution would prevent precipitation or might even cause the decomposition of many compounds. Apart from that, diluting such a solution with a precipitation solution that will further reduce the concentration of the acid anion by binding it to a metal cation forming a corresponding part of compound subject to precipitation will increase the probability of coprecipitation undesired hydrolytic products. That may be the principal reason that no one has managed to prepare any explosive Bi salt—either the product would not precipitate at all in the strongly acidic environment or it precipitated only in a less acidic environment but was subsequently inpured by hydrolysates of an undefined or a variable composition or these compounds are precipitated with priority depending on the solubility product of precipitated compounds.

The table below shows that Bi additionally forms a wide range of aqua-oxo-hydro complexes in aqueous solutions, depending on pH value. Since water molecules have no charge, the composition of an anhydrous complex can also be derived easily and its appearance in an anhydrous precipitate can also be expected—that, however, is based entirely on the condition when none of the above-mentioned undesired events occurs.

1. Positively trivalent hexa-aqua complex of $Bi(H_2O)_6$ or anhydrous $Bi(3+)$—normal salt.
2. Positively bivalent penta-aquahydroxo complex $Bi(H_2O)_5OH$ or anhydrous $Bi(OH)(2+)$
3. Positively monovalent tetra-aquadihydroxo complex $Bi(H_2O)_4(OH)_2$ or anhydrous $Bi(OH)_2(+)$
4. Positively tetravalent tetra-aquahydroxo complex $(BiO)_5(H_2O)_4OH$ or anhydrous $(BiO)_5OH(4+)$
5. Octaedric positively hexavalent di-aqua complex $(BiO)_6(H_2O)_2$ or $Bi_6O_4(OH)_4$ (6+)
6. Positively hexavalent hexa-oxo complex $(BiO)_6(6+)$ or simply $BiO+$ As it results from the above the preparation of Bi salt by means of a methatetical reaction is not an easy task.

One option would be to make use of the highly diluted solutions utilised in analytical chemistry—0.1-0.01%, whereby a sufficient level of acidification corresponds with approximately 0.1 M to keep the cations of Bi inside this solution to be precipitated using such compound forming Bi salt with sufficiently low solubility product (high pS). That enables the determination of Bi by gravimetrically means, e.g. as oxoformate, oxinate or pyrogallol salt. However, using such diluted solutions in the large scale process would not be efficient.

Analytical chemistry makes use of additional complex-forming agents, e.g. tartaric acid that bonds Bi ions into a soluble complex, and it is applied mainly in situations in which the precipitation is performed in a slightly acidic environment. However, practical experience has proved that in such complexes the bismuth ions are very hard to release.

Naturally, compounds of Bi can be prepared by simple dissolving metallic Bi, its oxide ($Bi_2O_3$) or oxo-carbonate $(BiO)_2CO_3$ in the corresponding acid; this applies mainly to salts of strong inorganic or organic acids.

All methods referred to above have been verified by practical testing carried out during the researching of explosive Bi salts—mainly salts of aromatic polynitro compounds, azides and certain selected tetrazoles. The simple dissolution of the oxide and the oxo-carbonate of Bi in saturated solutions of aromatic polynitro compounds, even at boiling point, did not achieve any success in regard to salt preparation simply because no reaction ever occurred. After this the metathetical reaction was utilised, as the only alternative option that implemented the use of common commercial salts of Bi; i.e. the chloride or the nitrate produced various substances, most of which were non-explosive products. There were some rare cases, limited only to the some derivatives of tetrazoles, of the successful preparation of products with insignificant explosive characteristics.

The main subject matters of this invention process are identifying the Bi salt suitable for use as a multi-purpose precipitant, the optimisation of the precipitation methods for producing specific compounds and the description of these compounds in regard to their explosive properties.

When designating a suitable precipitant that is able to provide enough Bi ions for sufficiently concentrated solutions, without the necessity of any increase of the acidity nor for the use of complex-forming agents, this invention refers to bismuth oxo-perchlorate.

It is generally known that very large anions, such as chlorate ($ClO_3-$) and particularly perchlorate ($ClO_4-$), feature a strongly dislocated charge and therefore a very low affinity to cations. In practice, the effect of this property—applicable primarily to perchlorates—is their extreme solubility, not only in water but also in various polar or non-polar solvents. With the exception of the salts of potassium, caesium and rubidium, perchlorates constitute the most soluble salts known, but their extreme solubility is not caused by their association with molecules of solvent. This is also relevant to perchlorates of precious and heavy metals. These facts are supported by the values of the Gibbs free energy that are required to form a free anion within the solution (in kJ/mol): nitrates—109, chlorides—131, perchlorates—8.5.

This theory is supported in the description of this compound in Inorganic Chemistry (H. Remy 1961); i.e. Bi perchlorate fallen-out from the concentrated perchloric acid in the form of a normal salt—$Bi(ClO_4)_3 \times 5H_2O$—that is further diluted and subjected to hydrolysis to form oxo-perchlorate—$BiOClO_4 \times H_2O$, crystallising in a rhombohedral pattern to form a monohydrate and its further dilution produces an acicular trihydrate. All these compounds demonstrate excellent solubility in water—even without any acid addition—and form clear and perfectly stable solutions.

Since Bi perchlorates are not commercially available, a method for their preparation and their potential isolation had to be developed. This method is based on the simple dissolution of an oxide or an oxo-carbonate of Bi in commercially available approx. 70% $HClO_4$. The product can then either be isolated by filtration or dissolved in water and such obtain solution poured into a graduated flask to match the defined solution concentration or the resultant oxo-perchlorate in an aqueous solution can be precipitated using organic solvents (see the sample procedures).

The method of simple precipitation in aqueous solutions is used for preparing various explosive compounds, such as those listed here: Bi salts of hydrazoic acid, Bi salts in the default series of aromatic polynitrophenols—of picric acid (TNF), styphnic acid (TNR) and trinitro phloroglucinol (TNFG) and further 4,6-dinitroazidophenol (DNAF) and 4,6-dinitrobenzofuroxane (DNBF) together with Bi salts of selected explosive 1-H-5-substituted tetrazole derivatives.

Based on the fact that most attempts led to the production of highly insoluble amorphous to colloidal compounds, the filtering property was improved by implementing the boiling precipitation method and an order for adding the solutions has been established to enable the precipitation to start from the most acidic environment possible in order to obtain the best possible crystalline products. In respect of the set concentration and the pH of solutions, precipitation can obviously be implemented under various conditions in regard to the reaction temperature and the method of pouring the solutions required for the precipitation process. These methods can actually influence the manner in which the Bi bonds within the molecules use any of the above-mentioned cations. This may also have a certain impact on the explosiveness of the resultant compound which is dependent not only on the overall metal content within each molecule but also on the nature of the bonds, with respect to the energies necessary for their cleavage—activation energies.

The content of Bi in the finished compounds was then determined analytically and the results obtained were used to identify the specific cations of Bi mentioned above bonded in the compound together with its quantity.

The compounds were additionally subjected to thermal testing using the difference thermal analysis (DTA) method and their sensitivity to flame and friction by regular explosive testing.

The examples set forth below are for the purpose of illustration and to describe embodimets of the best mode of the invention at the present time. The scope of the invention is not in any way limited by the examples set forth below.

EXAMPLES

Sample Embodiments of the Invention

The table below shows examples of energetic compounds that have been prepared using the method according to this invention.

| starting compounds | suggested formula compounds produced | Bi content (wt. %) | expl. T (° C.) | frictional sensitivity |
|---|---|---|---|---|
| Sodium azide | $BiON_3$ | 78 | 320 | − |
| Sodium picrate | $(NO_2)_3C_6H_2OBiO$ | 46 | 240 | − |
| Sodium styphnate | $(NO_2)_3C_6H(OBiO)_2$ | 60 | 220 | − |
| Sodium trinitrophloroglucinol | $(NO_2)_3C_6(OBiO)_3$ | 67 | 175 | − |
| 4,6-sodium dinitroazidophenolate | $(NO_2)_2C_6H_2N_3(OBiO)\cdot Bi_2O_3$ | 75 | 200 | − |
| 4,6-potassium dinitrobenzo-furoxanate | $(NO_2)_2C_6H_2N_2O_2BiO$ | 46 | 220 | − |
| 5,5'-sodium azotetrazolate | $N_{10}C_2Bi_2(OH)_4$ | 64 | 180 | + |
| 5,5'-sodium azotetrazolate | $N_{10}C_2(BiO)_2$ | 68 | 180 | + |
| 5,5'-sodium azotetrazolate | $N_{20}C_4(BiO)_5OH$ | 71 | 180 | + |
| 5-potassium nitraminotetrazolate | $N_5CHNO_2Bi(OH)_2$ | 56 | 190 | − |
| 5,5'-sodium bis-tetrazolate | $N_8C_2Bi_2(OH)_4$ | 67 | 280 | + |
| 5,5'-sodium diazoaminotetrazolate | $N_{11}C_2Bi_3(OH)_6$ | 69 | 240 | + |
| 5,5'-sodium bis tetrazolylhydrazinate | $N_{20}C_4H_4(BiO)_5OH$ | 70 | 150 | + |
| 5-sodium nitrotetrazolate | $N_4CNO_2Bi(OH)_2$ | 58 | 196 | − |

Each of the compounds had to be matched with the optimal precipitation method selected for achieving the best filterable products. This is applicable mainly in cases in which the solubility of the precipitate is so low that it will fall-out in a colloidal state (i.e. salts of 5,5'-azo-tetrazole, 5,5'-diazoaminotetrazole, 5,5'-bis-tetrazolylhydrazine and salts of TNFG). Azides and picrates, on the other hand, are significantly more soluble and fall-out in an amorphous or a micro-crystalline form that enables good filtration. This was the reason for the implementation of the proven principles—precipitation at the boiling point with the highest possible dilution level to increase the solubility of the precipitate and the expulsion of the product in a more filterable form. Practical application has proved, however, that actually the best results can be obtained using the most concentrated solutions possible because the precipitant used is an acidic solution of Bi oxo-perchlorate containing $HClO_4$, which is released during hydrolysis, and concentrating these solutions results in a significant drop in their pH that has been proven as having the strongest impact on the creation of crystalline compounds of Bi. Some compounds that are prone to decomposition in a strongly acidic environment (such as 5,5'-azotetrazolate, azide, 5,5 diazoaminotetrazole) had to be processed without precipitation at boiling point due to significant volume losses of the compound. Bi salts of these compounds are remarkably stable, however, even in strongly acidic environment, although such conditions could cause the almost immediate decomposition of their sodium salts.

That was the reason for preparation of a variety of standard solutions of Bi oxo-perchlorate, each with an identified concentration of Bi ions—e.g. 0.02 g/ml, 0.2 g/ml and also 0.45 g/ml, which the strongest solution obtainable utilising the technical production process. There are no stronger solutions available for transfer into a graduated flask.

Concentrated perchloric acid was obviously used to separate-out the "normal" perchlorate of Bi pentahydrate—however, this extremely hygroscopic and unstable compound is not suitable for practical applications.

A concentrated standard solution was also used to separate-out the oxo-perchlorate of Bi, by using precipitation with alcohol. Precipitation with methanol or ethanol took several days; the immediate precipitation of a product could be seen in the process using isopropyl alcohol. This new compound was then used for the precipitation of Bi salts from selected compounds, the explosive characteristics of which had been found to be the most significant or in such cases in which precipitation in a strongly acidic solution failed.

The testing conducted during the differential thermal analysis (DTA) involved heating-up a 20 mg sample at the standard rate of 5° C./min. Processes not involving any explosions or detonations but instead just an exothermic reaction (in Bi salts of 5-nitraminotetrazole, 5,5'-bis-tetrazole, 4,6-dinitrobenzofuroxane and 4,6-dinitroazidophenol) were continued with the heating rate increased to 20° C./min. That always resulted in detonations, except for the Bi salt of 4,6-dinitrobenzfuroxane, which showed deflagration only, and the Bi salt of 4,6-dinitroazidophenol, which showed only strong exothermal peak.

Friction sensitivity was tested by smearing the compound using a pestle in a porcelain bowl. Unless initiated, the compound was considered as being insensitive to friction as compared to regular primary explosives. Most uninitiated compounds actually showed black trace right beneath the pestle, which signifies that the reaction occurs in there and that it is not transferred to any other remaining material. Compounds exhibiting signs of frictional sensitivity (e.g. Bi salts of 5,5'-azotetrazolate and 5,5'-diazoaminotetrazole and 5,5'-bis-tetrazole and 5,5'-bis-tetrazolylhydrazine) were then diagnosed for frictional sensitivity using the frictional sensitivity gauge (PCT).

PCT sensitivity compared to TNRO.

| Compound | load in g at 0% activation | load in g at 100% activation |
|---|---|---|
| 5,5'-azotetrazolate of Bi | 500 | 2,800 |
| 5,5'-diazoaminotetrazolate of Bi | 700 | 2,000 |
| 5,5'-bis-tetrazolate of Bi | 5,000 | 8,000 |
| 5,5'-bis-tetrazolylhydrazinate of Bi | 6,000 | 12,000 |
| TNRO | 150 | 500 |

As shown in the table, the frictional sensitivity is lower than that for TNRO and that is why these explosives can be considered as safer for handling. However, with respect to their high sensitivity to stab ignition, the first two compounds in particular demonstrate their excellent functioning in any type of primer designated for centrefire or rimfire cartridges.

The higher metal content, as compared to that of TNRO, might imply weaker explosive properties—longer reaction times proved by drop tests involving the comparison of the pressure and time impulses for pure 5,5'-azotetrazolate of Bi with those of the regular types of Neroxine compositions containing 30-40% of TNRO—the results were comparable with more even and better reproducible results obtained with pure explosive only. Unfortunately, this method cannot be used for comparing both the explosives in pure state, because TNRO cannot be brought to explosion under the same conditions.

All the compounds listed below are sensitive to flame and they would deflagrate or detonate when inflamed. It is the Bi salt of 5,5'-bis-tetrazole that manifests the highest explosion temperature during DTA and that is substantially less sensitive to flame and it will be overheated and then detonated when inflamed.

The frictional sensitivity test was performed by applying friction with a porcelain pestle subject to variable load in on porcelain plate containing several milligrams of the examined compound. This test is highly subjective and its results only make sense when they are compared with the tests of other compounds that have already been implemented and the frictional sensitivity of which is known and has been subjected to verification for many years. Owing to the fact that the common primary explosive that is considered to be the least sensitive to friction is tetrazene, that is initiated by the load of 900-1,000 g, the sensitivity of the compounds listed above has been evaluated with reference to tetrazene. Any compound with substantially lower frictional sensitivity is labelled with –, while any sensitivity that to a certain extent is comparable will be defined using the indication+. These compounds could be potential candidates for their utilisation as the main (carrier) explosives in primers and in detonators. Any others explosives would then be considered as auxiliary or as applicable for various specific activation methods—by means of a resistance bridge, a spark or even a laser beam.

The suggested formulas have been derived from the bismuth content, as determined by means of complexometric titration at pH 2-3 with xylene orange as an indicator. The percentage content of Bi, determined by titration and stated in the table, with a certain degree of error in the determination process and the potential presence of contaminants—has been rounded to an integer. Nevertheless, apart from the already mentioned 4,6-dinitroazidophenol, the procedure revealed the consistency between the values measured and those calculated with a tolerance interval of ±1%.

Almost all the starting compounds, apart from 5-nitraminotetrazole and 4,6-DNBF, are in the form of sodium salts. Sodium azide is a common, commercially available, compound and the other explosive tetrazoles prepared by diazotisation or by Sandmayer's reaction or the reaction of azides with cyano compounds are also formed entirely of their sodium salts. 5-nitraminotetrazole and 4,6-DNBF actually fall-out more effectively in the form of potassium salt. 5,5'-azotetrazole can also be obtained in the form of other soluble salts of alkaline metals, e.g. potassium salt, but this salt is incomparably more soluble and that could cause certain complications during the process of its separation from the solution and potassium salts should preferably also be excluded from any reactions involving the precipitation of perchlorate solutions because the precipitation from more concentrated solutions would cause excessive precipitation of the very little soluble potassium perchlorate. On the other hand, the sodium perchlorate obtained from sodium salts in the course of a metathesis exchange at ambient temperature (T) is about 10-15 times more soluble at boiling temperature of its saturated solution. Immediately prior to the reaction the 5,5'-bis-tetrazolylhydrazine is converted into a soluble sodium salt.

The compounds mentioned above can be used in the same form as any other soluble salt, including metal salts and also the salts of certain organic or inorganic alkalis. In all these cases it is possible to use other alkaline metals such as lithium, caesium and rubidium. As far as salts of potassium, caesium or rubidium are concerned, the solutions used must be diluted more to avoid any undesired excessive precipitation of the less soluble perchlorates of these metals, while, on the other hand, perchlorates of all other metals are so soluble that their separation from the resultant compound can be carried out on a quantitative basis.

Salts of aromatic polynitrophenols can be prepared using the even more soluble alkaline earth salts (especially the salts of calcium, magnesium and strontium) and also the salts of some other metals, such as iron, nickel, cobalt and manganese. The salts of tetrazole derivatives can be produced using any salt of an alkaline metal and also alkaline earth salts, except for the salts of 5,5'-azotetrazole which are the least soluble salts of these metals. The above-mentioned tetrazoles can be obtained using salts or organic and inorganic alkalis such as hydrazine, guanidine and their amino derivatives.

In all these cases it is also possible to use ammonium salts.

Some of the starting compounds mentioned above are also hydrates with a stable or a variable content of crystal water. 5,5'-azotetrazolate and 5,5'-bis-tetrazolate are stable pentahydrates, while 5,5'-diazoaminotetrazolate can be tetra- to pentahydrate and 5-nitrotetrazolate can be di- to tetrathydrate.

The table only refers to the salts of selected energetic compounds. There are obviously many other compounds from which it is possible to form explosive salts using method in accordance with this invention—i.e. those having one or more substitutable hydrogens—e.g. the salts of 4,6-dinitro-3-hydroxychinon diazonium, 4,6-dinitro-3-carboxychinon diazonium, 2,3,6-trinitro-p-azidophenol, 5-azidotetrazole and 5-hydrazotetrazole and others. The general advantage of Bi salts lies in their minimal solubility, so, as has been proven in practical experiments, these salts can be precipitated from aqueous solutions without any problem; this is even possible in regard to such compounds as 5-nitrotetrazole, for example, wherein the most significant problem lies in the excessive solubility of its salts as also applies to the salts of such metals as Pb and Ba. The Bi salt will precipitate reliably and it will be expelled in an almost quantitative yield, which represents another irreplaceable advantage of Bi salts. On the other hand, it has to be considered that many salts are so insoluble that they will be precipitated in a hard-to-filter colloidal form and the preparation process will have to include the kind of procedures that ensure the enlargement of the particles to at least several microns.

The most interesting property of explosive Bi salts is their capability of initiation by stab—i.e. the concentration of energy to the smallest possible point. Even the compounds that are not found to be sensitive to friction or to shock in accordance with the regular criteria leave a black trace of reaction products at the point of contact between the pestle and the porcelain bowl. The compounds that show sensitivity to friction are also the ones that are the most are stab sensitive, which is a direct prerequisite for their use in ammunition primers, for example.

When combined with the other generally known components of primer composition, such as non-toxic pyrotechnical oxidising agents (potassium nitrate, caesium nitrate, oxo-nitrates of Bi), non-toxic fuels (Al, Ti, Zr, B), energetic components (NC, PETN and other energetic materials) and frictionators comprising heat non-conductive materials with a high melting point (e.g. glass, sulphides of Bi), some of the compounds prepared will be ideal for application in non-toxic primer, detonator and general ignition compositions.

The Preparation of Precipitation Solutions

The preparation of Bi perchlorate solutions:
Solution No. 1
Pour 24.5 ml of 70% perchloric acid over 22 g of Bi oxide and allow the reaction to occur while at the same time heating the solution slightly. Dilute the resultant suspension of bismuth perchlorate with water by transferring it into a 1,000 ml flask and then fill it up to the mark. The concentration of this solution is approx. 0.02 g of Bi/ml.
Solution No. 2
Pour 245 ml of 70% perchloric acid over 220 g of Bi oxide. Dilute the resultant suspension of bismuth perchlorate with water by transferring it into a 1,000 ml flask and then filling it up to the mark. The concentration of this solution is approx. 0.2 g of Bi/ml.
Solution No. 3
Pour 245 ml of 70% perchloric acid over 220 g of Bi oxide. Dilute the resultant suspension of bismuth perchlorate with water by transferring it into a 500 ml flask and then filling it up to the mark; the concentration obtained is approx. 0.4 g of Bi/ml.
The preparation of a solid oxo-perchlorate of Bi:
Dilute standard Solution 2 or 3 with excess isopropyl alcohol. Once that precipitated product has settled, filter-out on Büchner funnel, wash the product gradually with water and alcohol under suction than suck out and allow to dry.

The Preparation of Energetic Compounds

1) The preparation of an alkaline azide of Bi:
Add an approx. 10% solution of sodium azide to a measured volume of Solution No. 1 or 2 while stirring it vigorously. A white microcrystalline precipitate will be formed immediately after that. After settling this product will be filtered out on Büchner funnel, then washed gradually with water and alcohol under suction, than suck out and to dry.

2) The preparation of an alkaline picrate of Bi:
Warm an approx. 2% picrate solution and add it to a measured volume of Solution No. 1 or 2 while stirring it vigorously. The dark yellow crystalline product will start to fall out of the solution as it is cooling. Once it has cooled and completely settled, will be filtered out on Büchner funnel, then washed gradually with water and alcohol under suction, than suck out and to dry.

3) The preparation of an alkaline styphnate of Bi:
Use a solution of sodium styphnate—the additional steps match those of the procedure described in example No. 2 with such difference, that precipitation is carried out at boiling and are till heated for some time until the red precipitate has fallen out of the solution. Once it is cooled and settled, the amorphous product will be filtered out on Büchner funnel, then washed gradually with water and alcohol under suction, than suck out and to dry.

4) The preparation of an alkaline trinitrophloroglucinol of Bi:
Use a solution of sodium trinitrophloroglucinol; further procedure in the same as the procedure described in example No. 2. The product is extremely insoluble and for this reason it is precipitated in the form of amorphous products and will take longer time to settle. The product is and orange-coloured.

5) The preparation of an alkaline 5,5'-azotetrazolate of Bi (as according the order in the table):
Pour a saturated approx. 5% solution of 5,5'-sodium azotetrazolate pentahydrate to a measured volume of Solution No. 2 and the yellow amorphous product is allowed to settle completely and subsequent process of filtration separating, washing with water and alcohol, sucting off and drying similar in the same in the previous example.

6) The preparation of an alkaline 5,5'-azotetrazolate of Bi:
Bring a saturated approx. 5% solution of 5,5'-sodium azotetrazolate pentahydrate to the boil and add it to a measured quantity of boiling Solution No. 1, while stirring it vigorously. Further procedure is the same as the procedure described in example No. 5. This method causes a loss of approx. 50% of the product due to the chemical decomposition of the salt obtained in the acidic environment and at a high temperature (T). The product obtained is slightly more explosive and prone to detonation during ignition.

7) The preparation of an alkaline 5,5'-azotetrazolate of Bi:
Bring a saturated approx. 5% solution of 5,5'-sodium azotetrazolate pentahydrate to the boil and add it to an approx. 2% boiling solution prepared in advance by dissolving a calculated quantity of solid oxo-perchlorate of Bi in water, while stirring it continuously. Further procedure is the same as the procedure described in previous examples. A compound prepared under these conditions—i.e. in low acidic solutions, has a minimum of explosive properties as compared to the products described previously. However, it still retains sufficient friction sensitivity.

8) The preparation of an alkaline 5-nitraminotetrazolate of Bi:
Bring a saturated approx. 5% solution of 5-potassium nitraminotetrazolate to the boil and add it to a measured quantity of boiling Solution No. 1. Once it has cooled and settled completely, the colourless amorphous product will be filtered out on Büchner funnel, washed with hot water and alcohol, sucked off and dried.

9) The preparation of an alkaline 5,5'-diazoaminotetrazolate of Bi:
Add an approx. 10% solution of disodium salt of 5,5'-diazoaminotetrazole tetrahydrate to a measured quantity of Solution No. 2 or 3, while stirring it continuously. When using a more concentrated solution, the result will be a colourless and fast-settling product that can already be filtered a few hours later. A more diluted solution will produce a yellowish precipitate that requires at least one day to turn into a well filterable (non-colloidal) product.
The additional steps of separating, washing and drying similar in the same in the previous example. Both these products after drying at room temperation are canary yellow coloured.

10) The preparation of an alkaline 5-nitrotetrazolate of Bi:
Bring an approx. 10% solution of 5-sodium nitrotetrazolate-di-tetra hydrate to the boil and add it to a measured quantity of boiling Solution No. 1 or 2, while stirring it continuously. During cooling under these conditions the precipitation will be gradual and the white microcrystalline precipitate will be cooled and settled out. Further procedure is the same as in the previous example.
Reaction can also be carried out at cold state using solution No. 3.

11) The preparation of an alkaline 5,5'-bis-tetrazolate of Bi:

This reaction has been used an approx. 10% solution of 5,5'-sodium-bis-tetrazolate pentahydrate. The procedure is the same as in the previous example and the reaction can be carried out in either a hot or a cold state. The product is colourless and amorphous.

12) The preparation of an alkaline 5,5'-bis-tetrazolyl-hydrazine Bi:

Prepare an aqueous suspension of 5,5'-bis-tetrazolyl-hydrazine in such a manner that the neutralisation of 2 N NaOH produces an approximately 0.2-0.5% solution of a sodium salt of 5,5'-bis-tetrazolyl-hydrazine. Heat the solution to the boiling point and stir it vigorously; the precipitation must be carried out using droplets of the saturated solution of solid $BiOClO_4$. Allow the resultant milky colloidal suspension to boil for a few minutes prior to leaving it to rest for a few days to ensure that the amorphous product will be obtained a more filterable form. Than the product is sepparated by filtration on Büchner funnel, washed with water and alcohol sucked out and allowed to dry. The result products was canary yellow coloured.

Note: Optimal results were achieved with a pH equal to 3-5. Strongly acidic solutions undergo back partial or full precipitation of the 5,5'-bis-tetrazolyl-hydrazine in unreacted form.

13) The preparation of an alkaline 4,6-dinitrobenzo-furoxanate of Bi:

A hot-saturated solution of potassium salt of 4,6-DNBF was prepared and poured into a measured quantity of hot Solution No. 2. The crystalline DNBF was precipitated again after cooling by its simple precipitation from its potassium salt in an acidic environment without the occurrence of any observable reaction. This was the reason for adding a certain quantity of an organic solvent—acetone, whereby the precipitated DNBF re-dissolved again and this solution was allowed to sit for several weeks. The colour of the aqua-acetone solution then gradually changed from dark crimson to dark brown while the brown microcrystalline product was precipitated. After sucking and washing with water and subsequently acetone on Büchner funnel, product was sucked out and allowed to dry at the room temperature.

14) The preparation of an alkaline 4,6-dinitro-azido-phenolate of Bi:

Pour the saturated solution of sodium salt of 4,6-dinitro-azido-phenol into a measured quantity of Solution No. 2, while stirring it continuously. The redbrown-coloured amorphous product is falling-out immediately and is gradually changging into a brown precipitate. After allowing the product of complete settle, the additional steps of separating on Büchner funnel, washing with water and alcohol, was sucked out and allowed to dry.

INDUSTRIAL APPLICATIONS

The compounds mentioned above are significant because of their high thermal and chemical stability and their resistance to moisture absorption. These are substantially less brisant explosives than other comparable already existing primary explosives such as dinol or TNRO. They still provide a sufficiently warm flame and also a long heat impulse, combined with an efficient heat transfer mechanism. That is why they are basically predestined for application as main primary explosives, especially those that show a sufficient degree of sensitivity to friction and primarily to stab, and for use in primers designated for centrefire and rimfire ammunition and for cartridges for sporting, hunting and also for military ammunition.

Compounds that are less sensitive to mechanical impulses can that be used as auxiliary energetic materials for primer compositions and for various types of ignition systems utilising pyrotechnical compositions, for squib for electric blasting caps and for airbags.

The invention claimed is:

1. A method for preparation of energetic compounds based on bismuth salts with reduced toxicity, having properties of primary explosives, said method comprising:
   preparing a suspension of soluble bismuth perchlorates by a reaction of bismuth oxide and perchloric acid;
   reacting said soluble bismuth perchlorates with water to form a solution; reacting said solution with soluble salts of organic or inorganic energetic compounds by a metathetical reaction forming a precipitate of bismuth energetic compounds;
   wherein the soluble salts of the organic or inorganic energetic compounds are based on azides, aromatic polynitro compounds, or derivatives thereof, or nitrogenous heterocyclic compounds, thereby forming a bismuth salt having a bismuth cation selected from the group consisting of $Bi(3+)$, $BiO(+)$, $Bi(OH)_2(+)$, $Bi(OH)(2+)$, $(BiO)_5OH(4+)$, and $Bi_6O_4(OH)_4(6+)$ and an anion selected from the group consisting of inorganic azides, polynitro-phenols, polynitro-azido-phenols, derivatives of polynitro-diazo-chinones, polynitro-furoxanes and five-membered nitrogenous heterocycles or derivatives thereof.

2. The method according to claim 1, wherein the bismuth cation formed is dependent on the pH of the reaction solution.

3. The method according to claim 1, wherein the soluble bismuth perchlorates are reacted with soluble salts of polynitro-phenols, derivatives of polynitro-diazo-chinones, polynitro-azido-phenols, polynitro-furoxanes, or any combination thereof.

4. The method according to claim 3, wherein the polynitro-phenols are selected from the group consisting of picric acid (2,4,6-trinitrophenol), styphnic acid (2,4,6-trinitroresorcinol), and trinitrophloroglucinol (2,4,6-trinitro-1,3,5-trihydroxybenzene).

5. The method according to claim 3, wherein the derivatives of polynitro-diazo-chinones are selected from the group consisting of 4,6-dinitro-3-hydroxyl-chinon-diazonium and 4,6-dinitro-3-carboxy-chinon-diazonium.

6. The method according to claim 3, wherein the polynitro-azido-phenols are selected from the group consisting of 4,6-dinitro-2-azido-phenol and 2,3,6-trinitro-p-azido-phenol.

7. The method according to claim 3, wherein the polynitro-furoxanes is 4,6-dinitro-benzo-furoxane.

8. The method according to claim 1, wherein the five-membered nitrogenous heterocycles are tetrazole derivatives selected from the group consisting of 5,5'-azo-tetrazole, 5,5'-azoxy-tetrazole, 5,5'-bis-tetrazole, 5,5'-diazo-amino-tetrazole, 5,5'-bis-tetrazolyl-hydrazine, 5-nitramino-1-H-tetrazole, 5-nitro-1-H-tetrazole, 5-azido-1-H-tetrazole and 5-hydrazo-1-H-tetrazole.

9. The method according to claim 1, wherein the soluble bismuth perchlorate is a bismuth oxo-perchlorate.

* * * * *